July 19, 1927.

E. FRÖLICH 1,635,989

FLUID PRESSURE REGULATOR

Filed May 23, 1925

Ernst Frölich
by C. P. Goepel
Attorney.

July 19, 1927.  1,635,989

E. FRÖLICH

FLUID PRESSURE REGULATOR

Filed May 23, 1925  6 Sheets-Sheet 6

Ernst Frölich
by C. P. Grepel
Attorney.

Patented July 19, 1927.

1,635,989

UNITED STATES PATENT OFFICE.

ERNST FRÖLICH, OF ESSEN-ON-THE-RUHR, GERMANY, ASSIGNOR, BY MESNE ASSIGNMENTS, TO THE HANNAUER CAR RETARDER COMPANY, OF CHICAGO, ILLINOIS, A CORPORATION OF ILLINOIS.

FLUID-PRESSURE REGULATOR.

Application filed May 23, 1925, Serial No. 32,300, and in Germany May 28, 1924.

My invention relates to improvements in fluid pressure regulators, such as are used for example in connection with pneumatic or hydraulic operating means for track brakes. The object of the improvement is to provide a regulator by means of which the pressure supplied to the said pneumatic or hydraulic means can be set to the desired value and is automatically regulated for example in case of a reaction caused by the brake. With this object in view my invention consists in providing a regulating member for the supply and discharge of the fluid from the pneumatic or hydraulic system, which member is under control by the attendant and under automatic control by the pressure within the system.

For the purpose of explaining the invention several examples embodying the same have been shown in the accompanying drawings, in which the same reference characters have been used in all the views to indicate corresponding parts. In said drawings, Fig 1, is a diagrammatical view showing my improved system as used in connection with a track brake and the pneumatic or hydraulic operating means therefor, Fig. 2, is a similar view showing a modification of the regulating means;

Fig. 3, is an elevation showing a modification of the regulating means,

Figure 1:
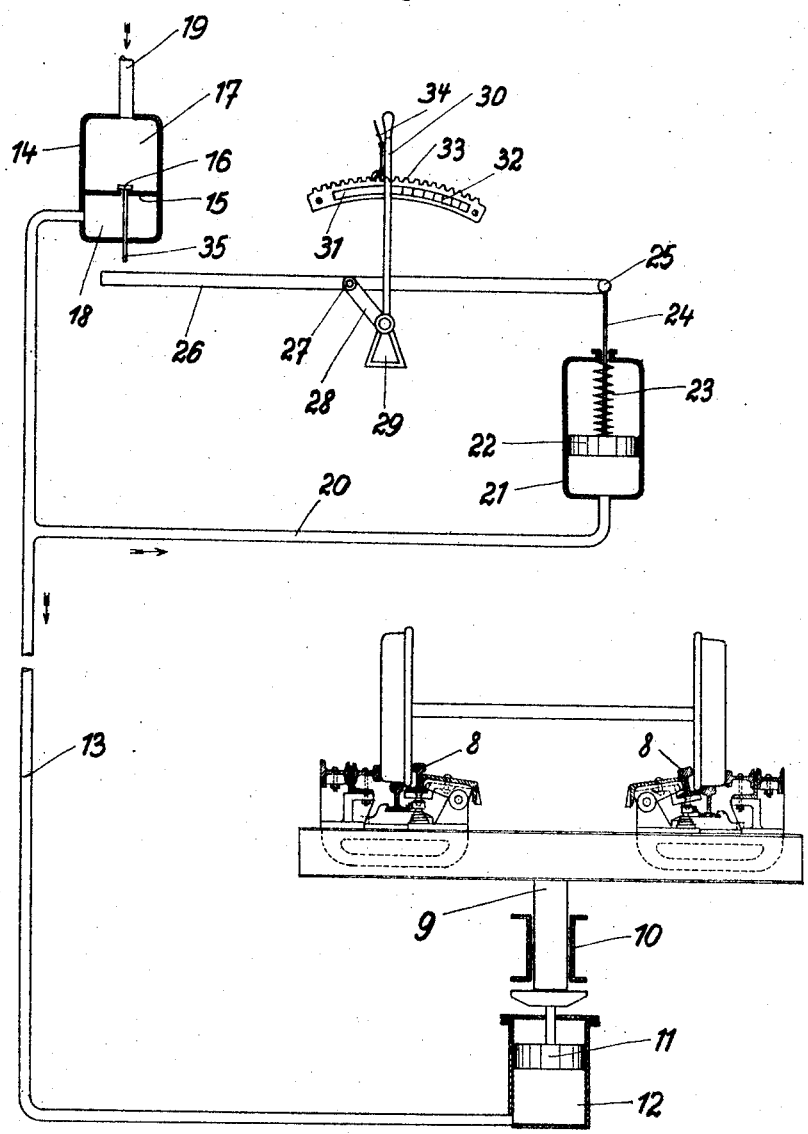

In the example shown in Fig. 1 my improved fluid pressure regulating apparatus is shown as used in connection with a track brake of the construction shown for example in the patent of the United States, No. 1,495,320, said brake comprising brake shoes 8 adapted to be lifted into braking position by means of a ram 9 guided at 10 and adapted to be acted upon by a piston 11 mounted in a hydraulic or pneumatic cylinder 12. The cylinder 12 is connected by a pipe 13 with a regulating apparatus comprising a valve casing 14 provided with a partition 15 and a valve 16. By the said partition and its valve 16 the casing 14 is divided into chambers 17 and 18, the chamber 18 communicating with the pipe 13 and the chamber 17 having a supply of the pressure fluid through a pipe 19. The pipe 13 communicates through a pipe 20 with a cylinder 21 in which a piston 22 is mounted, which piston is acted upon by a spring 23 tending to force the same downwardly and against the pressure of the fluid within the pipe 20. The piston rod 24 is connected at 25 with a beam 26 joined at 27 to an arm 28 rockingly mounted at 29 and rigidly connected with a hand lever 30. The said hand lever is adapted to be fixed in different positions relatively to a segment 31 provided with scale marks 32. As shown the said segment is formed with teeth 33 adapted to be engaged by a spring pressed pawl 34. The left hand end of the beam 26 is disposed below the bottom end of the stem 35 of the valve 16.

The operation of the regulating apparatus is as follows As is known to those skilled in the art the fluid pressure acting on the piston 11 and the track brake must be different according to the desired power of the brake, which power depends for example on the length of way of the vehicle, the weight thereof, the strength of the wind, the humidity of the rails and other conditions. After the attendant has determined what power should be applied to the brake he sets the lever 30 into the corresponding position indicated by the scale marks 32. Thereby the beam 26 strikes against the bottom end of the stem 35, thus unseating the valve 16, whereupon pressure fluid is admitted from the pipe 19, through the partition 15 and the pipe 13 to the cylinder 12. Further the fluid pressure is transmitted to the cylinder 21, and as soon as the desired pressure has been established within the said cylinder the piston 22 is moved in opposition to the action of the spring 23 so far that the beam 26 disengages the stem 35, whereupon the valve 16 is closed.

Figure 2:
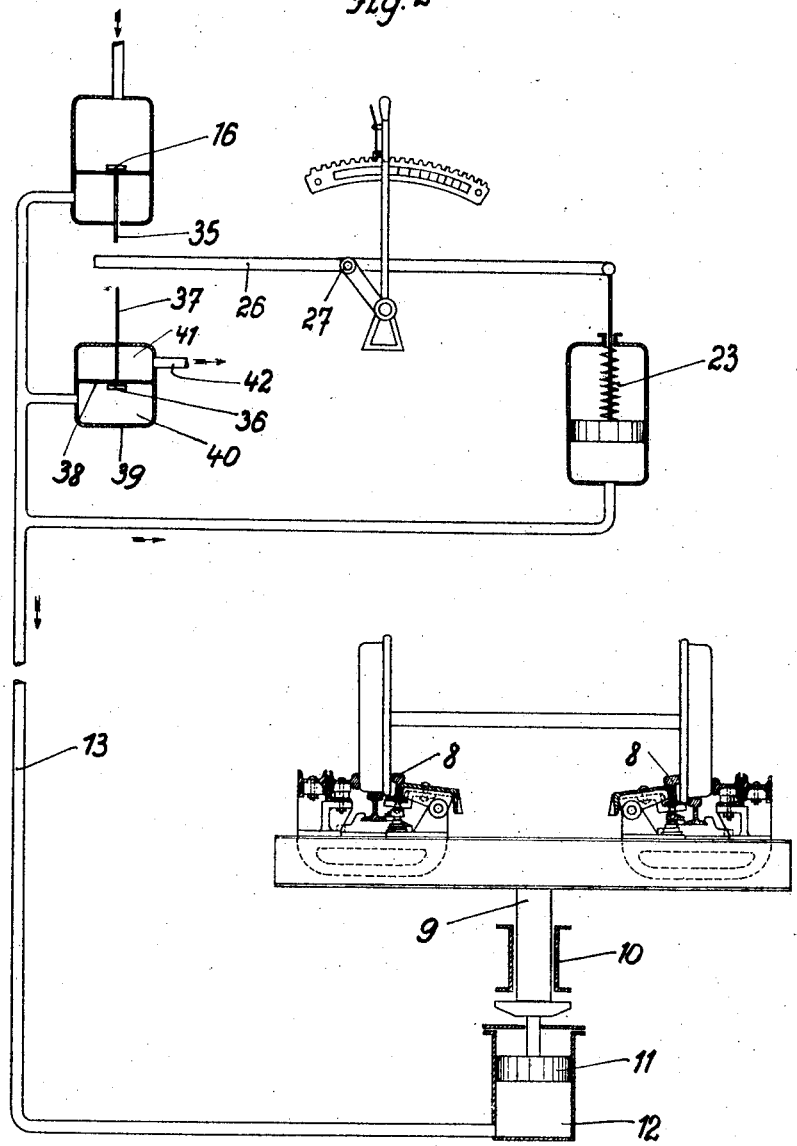
Figure 3:
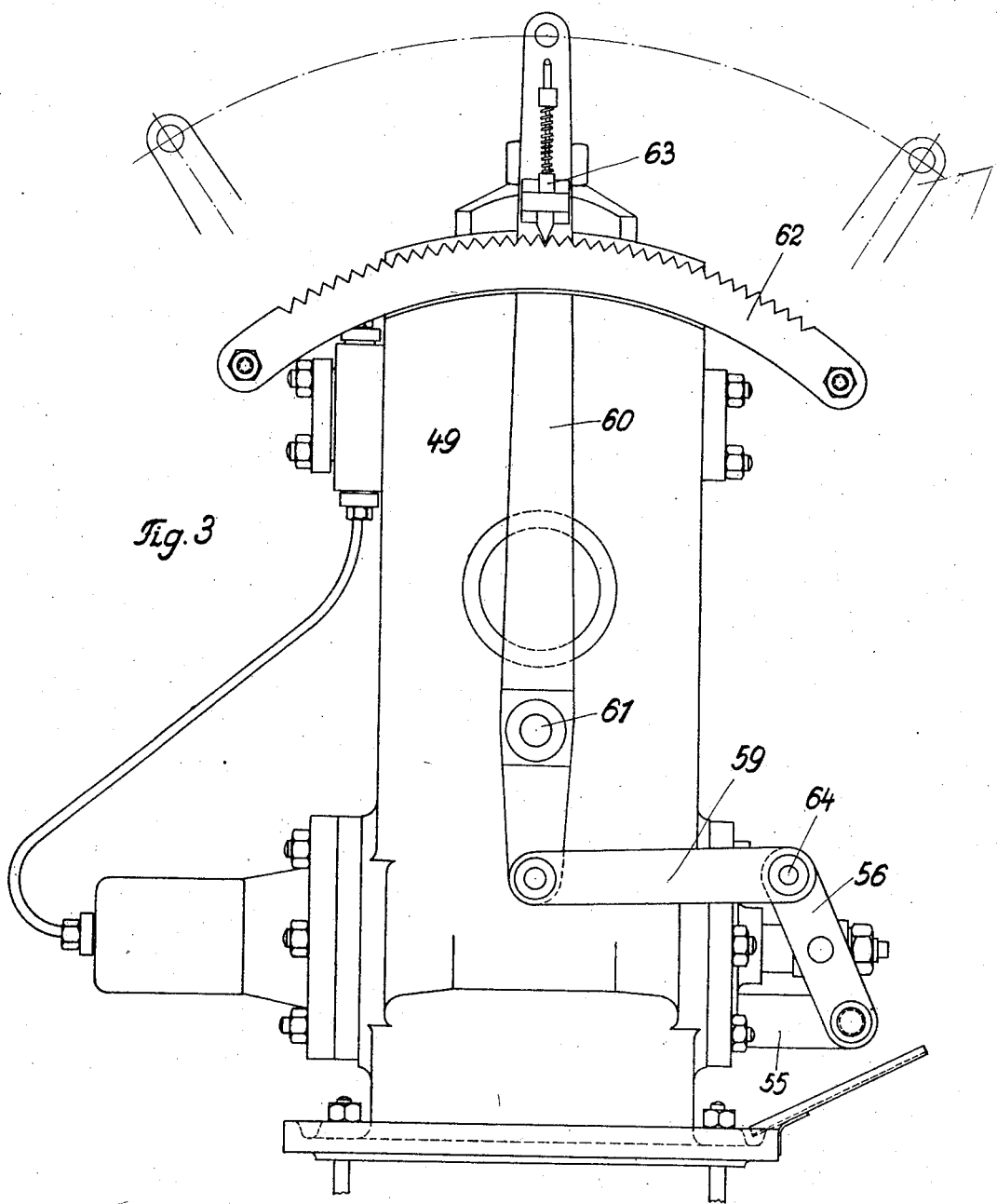
Figure 4:
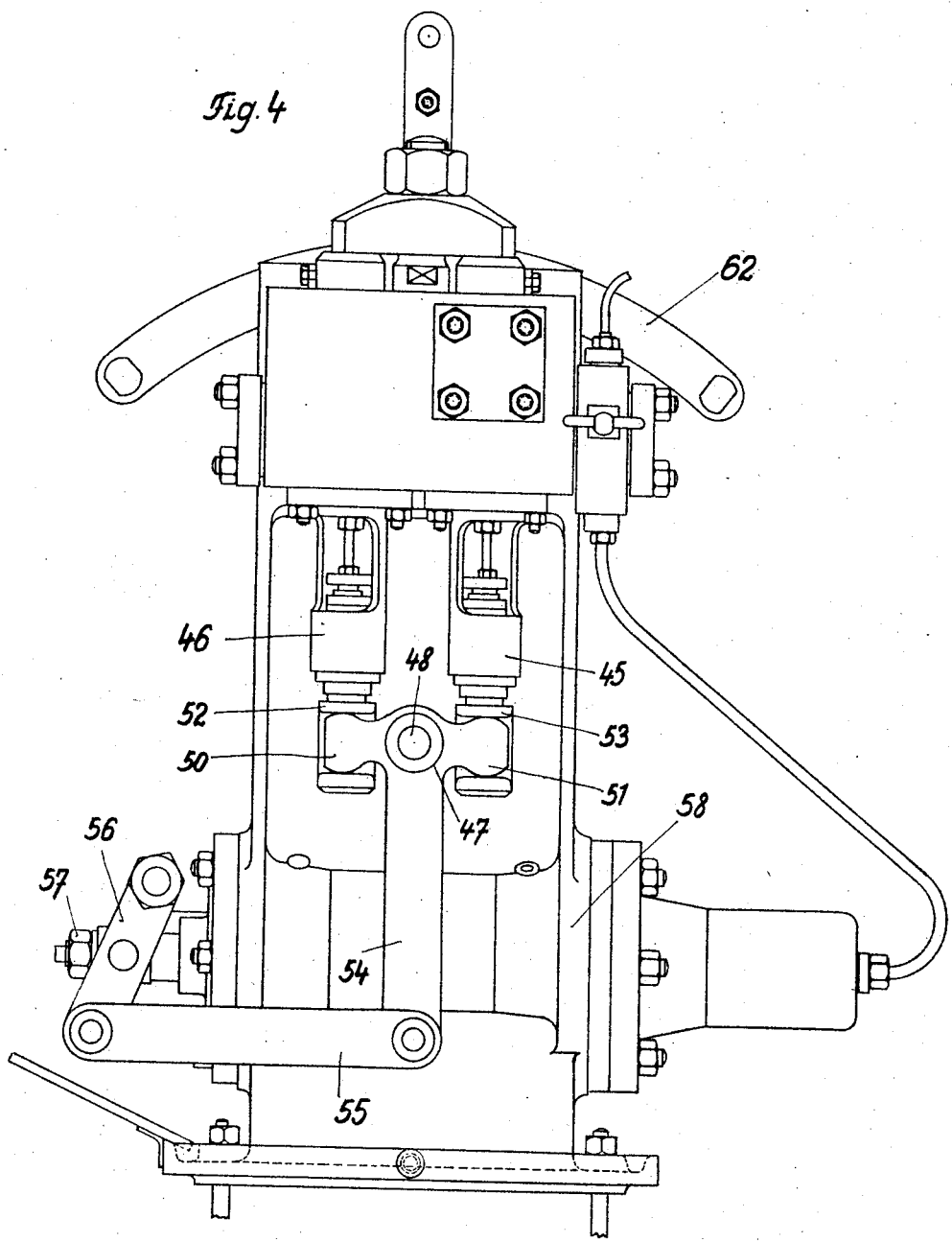
Fig. 4, is an elevation looking from the rear of Fig. 3.
Figure 5:
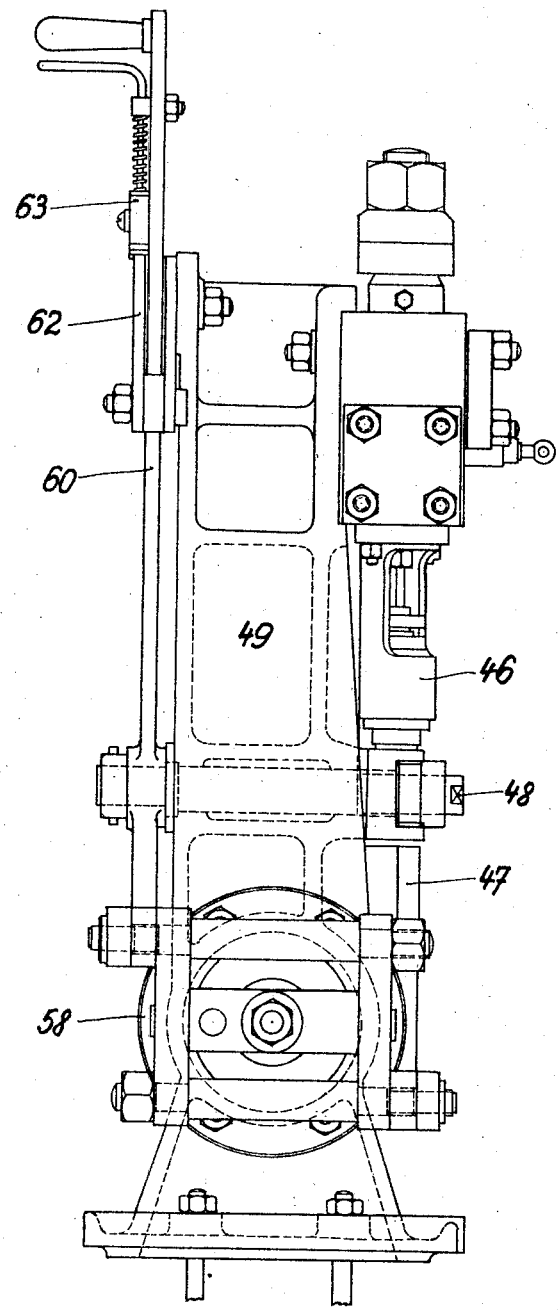
Fig. 5, is an elevation looking from the right in Fig. 1.

In the modification shown in Fig. 2 the main parts of the regulating apparatus are the same as those described with reference to Fig. 1, and the same reference characters have been used to indicate corresponding parts. In addition to the parts shown in Fig. 1 the regulating apparatus comprises a discharge valve 36 having a stem 37 and mounted in the partition 38 of a valve casing 39, the chamber 40 of the said valve casing communicating with the pipe 13, and the chamber 41 having a discharge 42, the valve stem 37 is in position for engagement by the beam 26 and at the side thereof opposite to the valve stem 35.

The operation of the apparatus for admitting pressure fluid to the cylinder 12 is the same as that described with reference to Fig. 1. In addition the apparatus has the following function: If the pressure admitted to the pipe 13 exceeds the desired value the spring 23 is compressed beyond the normal degree, whereupon the beam 26 rocking about the fulcrum 27 strikes on the stem 37 of the discharge valve, thus causing the escape of a part of the pressure fluid through the chamber 41 and the discharge passage 42. An excessive increase of the pressure is sometimes caused by the reaction of the brake on the piston 11, and in such cases a part of the pressure fluid is immediately discharged through the pipe 42 in the manner described. Upon a reduction of the reaction the spring 23 is expanded so far that the beam 26 opens the intake valve 16 for admitting a certain amount of pressure fluid, until normal conditions are attained.

In Figs. 3 to 5 and 7 I have shown a modification in which the inlet valve 45 and the discharge valve 46 are placed one beside the other and on a frame 49. The said valves are controlled by means of a T-shaped lever 47 having a rocking support on a shaft 48 mounted in the frame 49, the horizontal arms 50 and 51 engaging respectively in cross-heads 52 and 53 acting on the stems of the said valves. The vertical arm 54 of the lever 47 is connected by a link 55 with a lever 56 rockingly mounted on the rod 57 of a piston 68 disposed in a cylinder 58, the said cylinder corresponding to the cylinder 21 shown in Fig. 1 and enclosing the said piston and a spring 67 acting thereon, and communicating with the pipe system, as has been described with reference to Fig. 1. Further, the lever 56 is connected by a link 59 with a hand lever 60 having a rocking support at 61. The said hand lever moves at the rear of a toothed segment 62 mounted on the frame 49, and on the lever a spring pressed pawl 63 is mounted, which is adapted for engagement with the teeth of the segment 62. In this construction the lever 56, which is acted upon by the pressure fluid and a spring, is supported on the link 59 at 64. The said point 64 being adapted to be shifted by means of the hand lever 60. By thus shifting the fulcrum 64 of the lever 56 the valves 45 and 46 are set in different positions for supplying fluid of higher or lower pressure to the system.

Figure 6:
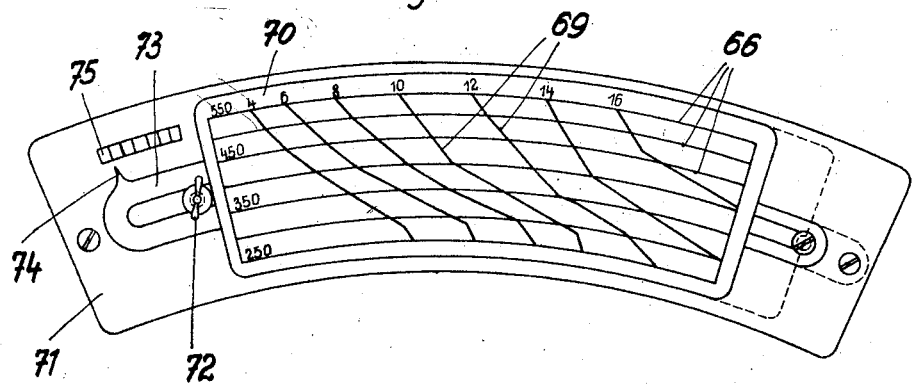
Fig. 6, is a detail view showing a scale used in connection with my regulating apparatus.
Figure 7:
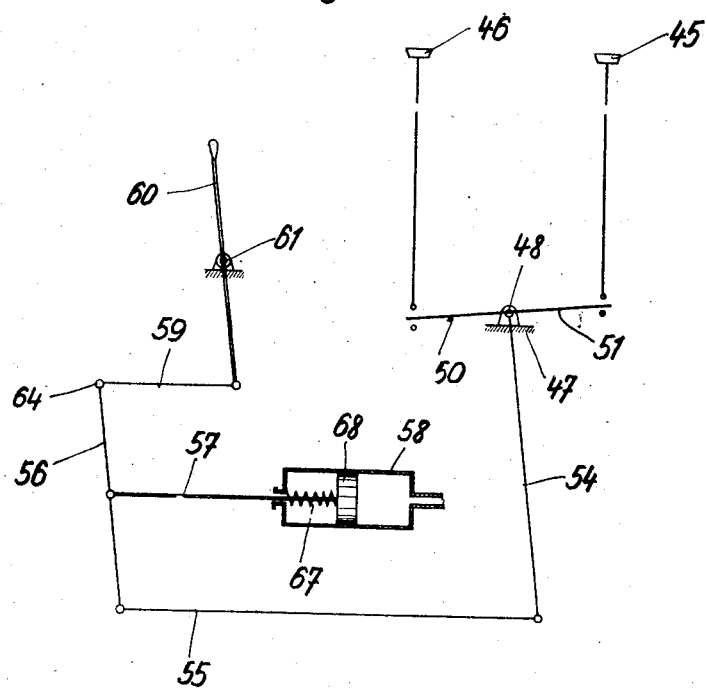
Fig. 7, is a diagrammatical view illustrating the construction shown in Figs. 3 to 5.

The toothed segment 62 is provided with scale marks indicating the pressure of the fluid. In the example referred to above, in which the regulating apparatus is designed for use in connection with a track brake I prefer to provide the scale marks with figures indicating the length of way of the vehicle. Now the braking power required for reducing the inertia of the vehicle so far that it runs through a certain length of way depends on the weight of the car and its freight. In Fig. 6 I have shown a system by means of which the different conditions, that is the weight of the vehicle and the desired length of way, can be readily taken into account. As shown in the said figure a plurality of concentric lines 66 are disposed one above the other, which lines are provided with the numbers 250, 350, 450, 550 indicating the desired length of way of the vehicle. On each of the said lines points 4, 6, 8, 10, etc. have been marked which represent the weight of the vehicle to be braked, which points are preferably found out by tests. Preferably the marks made on the concentric lines 66 are connected by transverse lines 69. For taking into consideration other conditions such for example as the wind and the humidity of the rails the scale 66, 69 is provided on a plate 70 movable on a plate 71 in circumferential direction and adapted to be fixed in position by means of a wing nut 72 passing through a slotted extension 73 of the plate 70. The said slotted part 73 is provided with a point 74 movable relatively to a scale 75.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. In an apparatus for controlling the fluid pressure: a combination of a fluid container having a supply of pressure fluid thereto and means for regulating the supply of the pressure fluid to the container, with an operating lever arranged outside and independent of the said fluid container, but adapted to control the fluid regulating means, and an adjustable hand lever hinged outside of the fluid container and adapted to shift the fulcrum of the said operating lever, a cylinder separated from or communicating with the said fluid container, and a spring pressed piston within said cylinder, and connected with the said operating lever.

2. In an apparatus for controlling the fluid pressure, a combination of a fluid container having a supply of pressure fluid thereto, two valves controlling respectively the supply to and the discharge from said fluid container, a two-armed operating lever controlling said valves, hand-operated means positively connected to the valve-operating lever and adapted to change its normal position of rest, and means controlled by the pressure within the fluid container and being likewise positively connected to the valve-operating member, so as to move the latter in conformity with the pressure fluctuations.

3. In an apparatus for controlling the fluid pressure, the combination, with a container, and a supply of the pressure fluid thereto, of two valves disposed one beside the other and controlling respectively the supply to and the discharge from said container, a T-shaped operating member having two arms in position for opening said valves and its third arm connected with a lever having a fulcrum adapted to be shifted by hand, a cylinder communicating with said container, and a spring pressed piston within said cylinder and connected with said lever.

4. In a track brake, the combination, with the brake shoe, and means operated by fluid pressure for moving said shoe into braking position, of a supply of pressure fluid to said means, and controlling means for said supply comprising a valve, an operating member therefor having a fulcrum adapted to be shifted by hand and means controlled by the fluid pressure within said fluid pressure operated means and connected with said member.

5. In a track brake, the combination, with the braking mechanism, and fluid pressure operated mechanism connected therewith, of means controlling the pressure within said operating mechanism, said means comprising a hand lever and a scale comprising a plurality of individual scales corresponding to the desired length of way of the vehicle and each having points marked thereon corresponding to the weight of the vehicles to be braked.

6. In a track brake, the combination, with the braking mechanism, and fluid pressure operated mechanism connected therewith, of means controlling the pressure acting on said operating mechanism, said means comprising a hand lever and a scale comprising a plurality of individual scales corresponding to the desired length of way of the vehicle and each having points marked thereon corresponding to the weight of the vehicles to be braked, said scale being mounted for being shifted in the direction of the movement of said hand lever.

In testimony whereof I hereunto affix my signature.

ERNST FRÖLICH.